June 23, 1953
N. H. MORRISON
2,643,119
MACHINE FOR HANDLING GREETING CARDS
OR OTHER SHEETLIKE ARTICLES
Filed Aug. 31, 1948
7 Sheets-Sheet 5
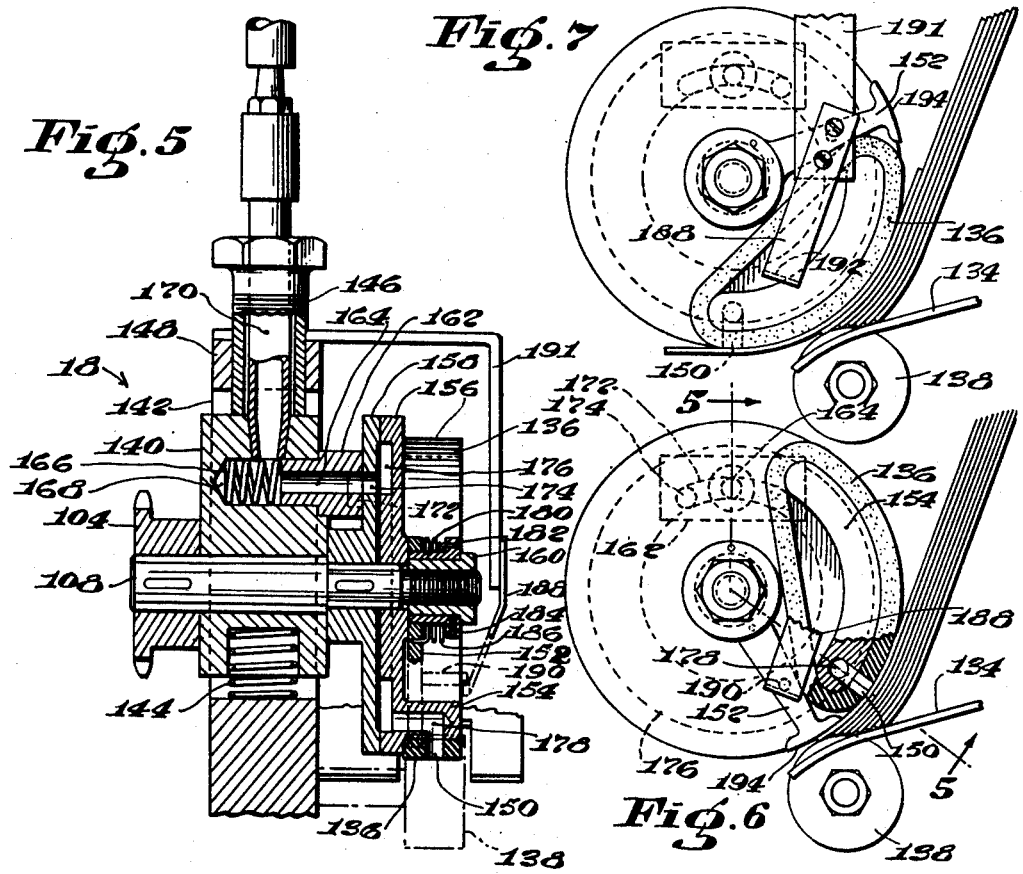
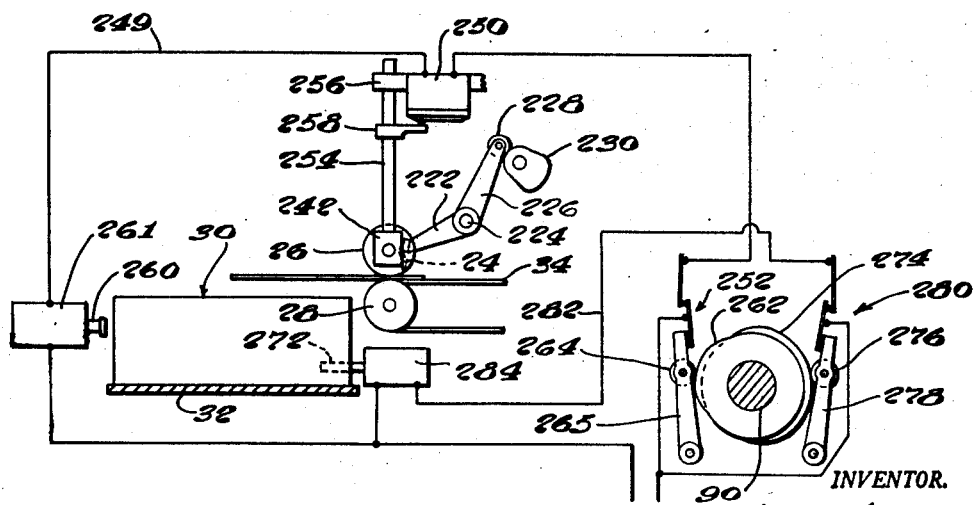
INVENTOR.
Nathan H. Morrison
BY Campbell, Brumbaugh, Free & Graves
ATTORNEYS

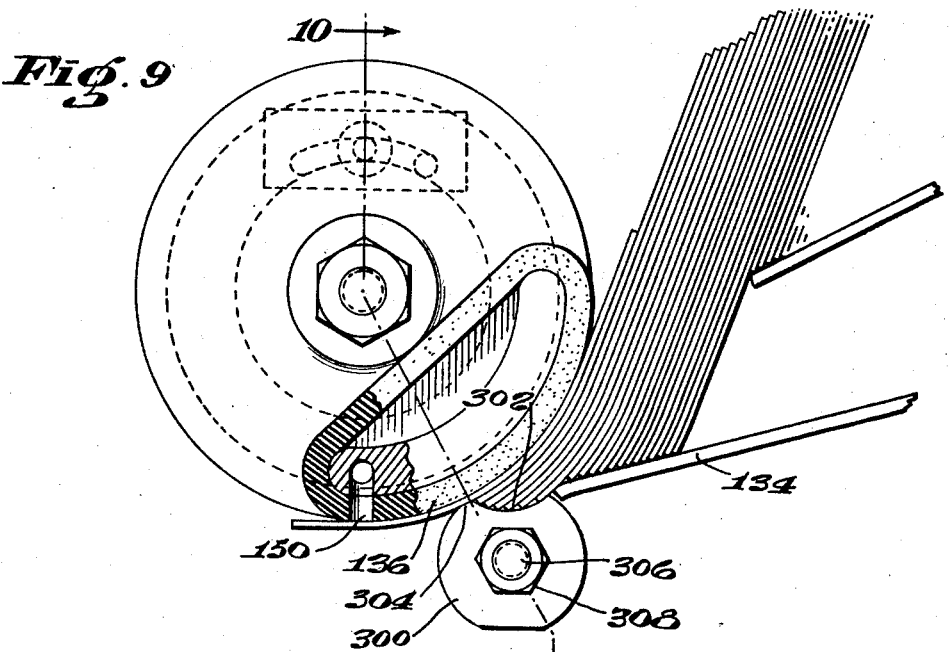
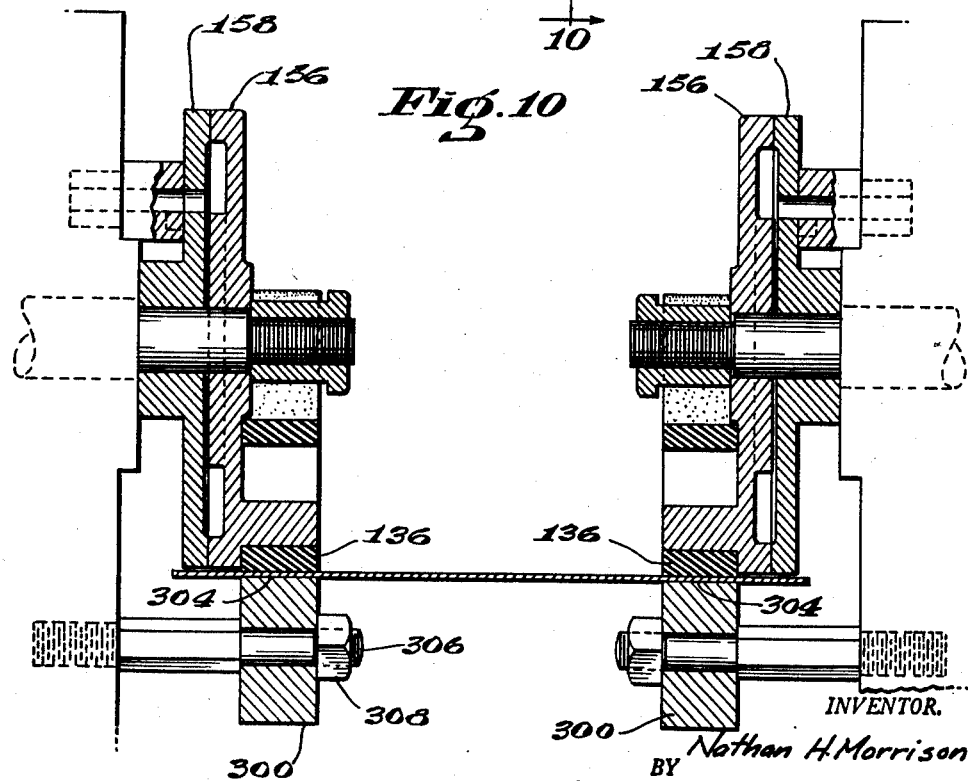

INVENTOR.
NATHAN H. MORRISON

Patented June 23, 1953

2,643,119

UNITED STATES PATENT OFFICE 2,643,119

MACHINE FOR HANDLING GREETING CARDS OR OTHER SHEETLIKE ARTICLES

Nathan H. Morrison, Lowell, Mass., assignor, by mesne assignments, to R. R. Heywood Co., Inc., New York, N. Y., a corporation of New York Application August 31, 1948, Serial No. 47,076

15 Claims. (Cl. 271—29)

This is a continuation-in-part of application Serial No. 761,450, filed July 17, 1947, by Nathan H. Morrison, for Machine for Handling Greeting Cards or Other Sheetlike Articles, now U. S. Patent No. 2,625,342.

This invention relates to a machine for handling greeting cards or other sheet-like articles and particularly to a collating machine for assembling a greeting card and an envelope by inserting the greeting card under the closing flap of its envelope and for transferring the collated articles into a container.

The invention has for an object to provide a novel and improved collating machine of the character specified in which provision is made for assembling successive sheet-like articles into collated relationship and for transferring them into a container in a novel, superior and efficient manner.

The invention has for a further object to provide a novel and improved sheet feeding device for withdrawing successive foremost sheets from a stack thereof in an efficient and superior manner.

With this general object in view and such others as may hereinafter appear, the invention consists in the collating machine and in the various structures, arrangements and combinations of parts hereinafter described and particularly defined in the claims at the end of this specification.

Figure 1:
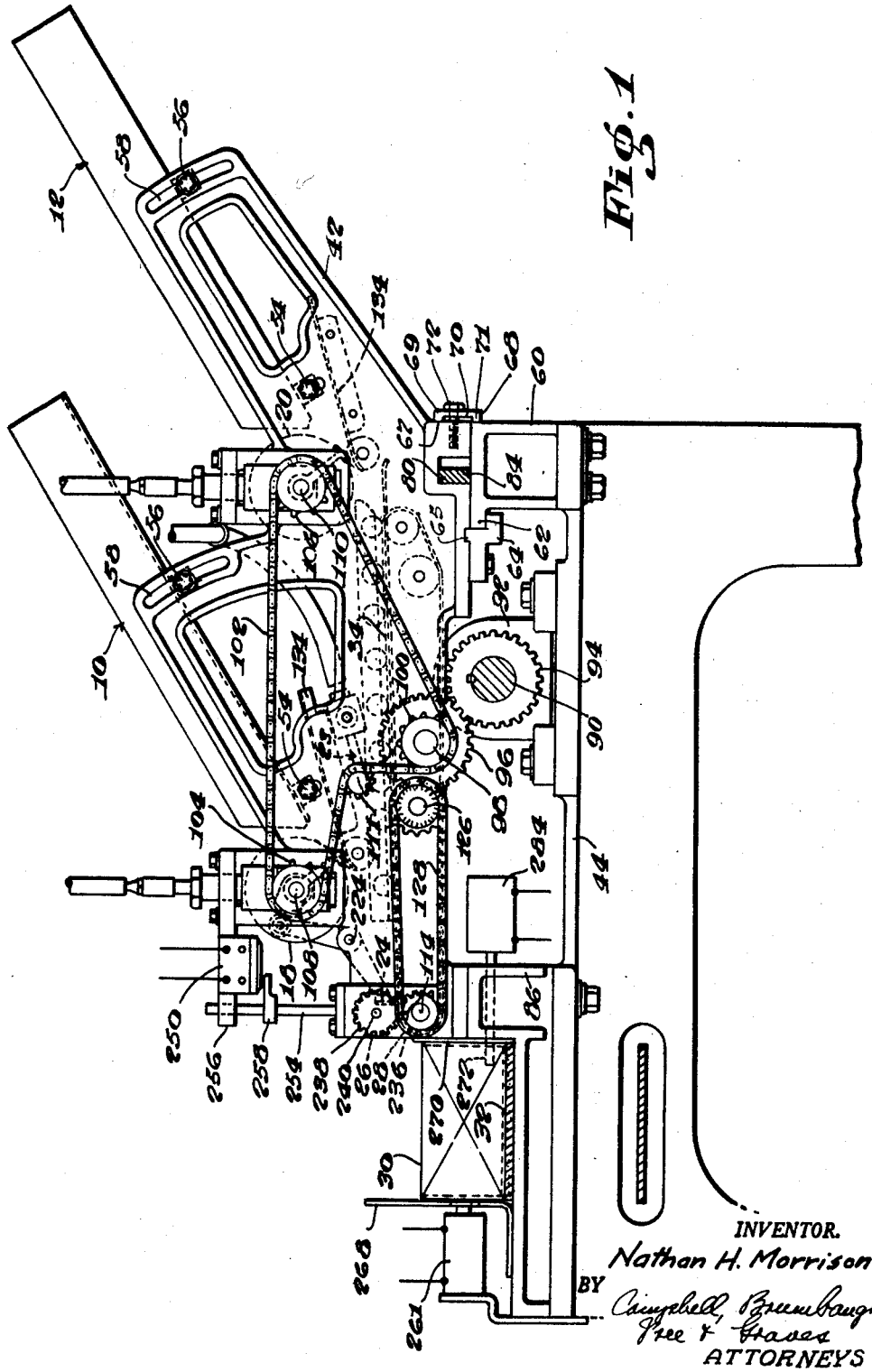
Figure 2:
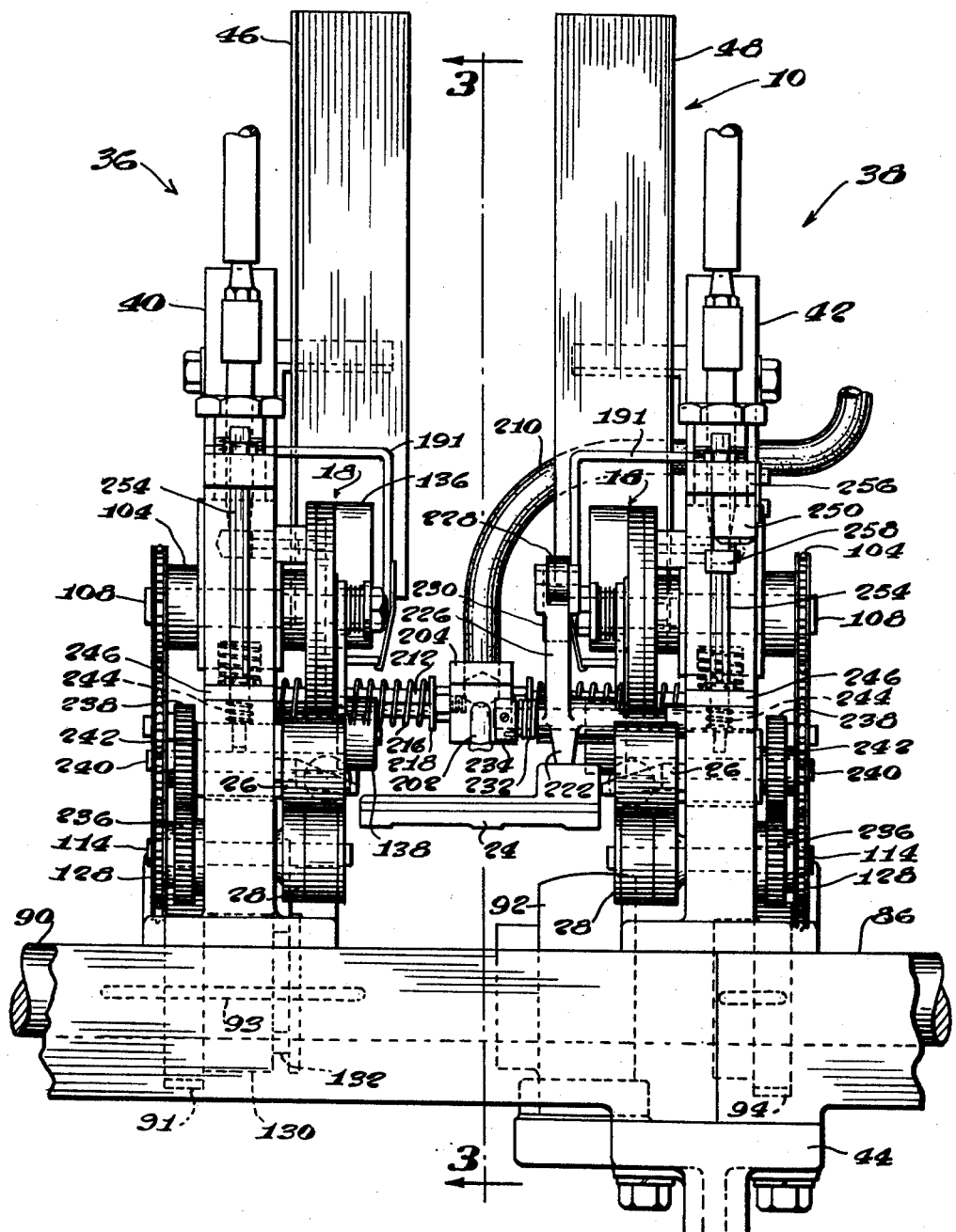
Figure 3:
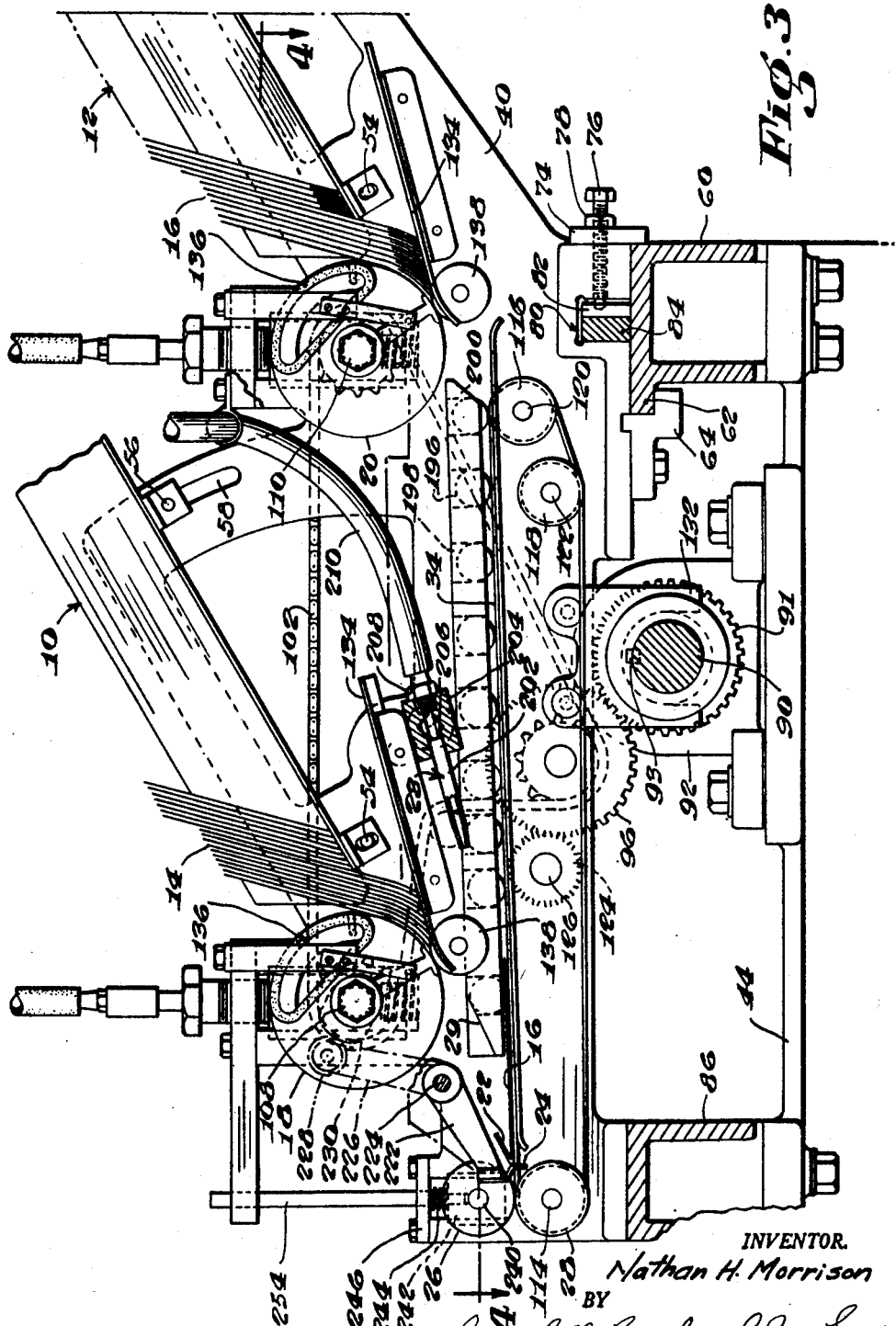
Figure 4:
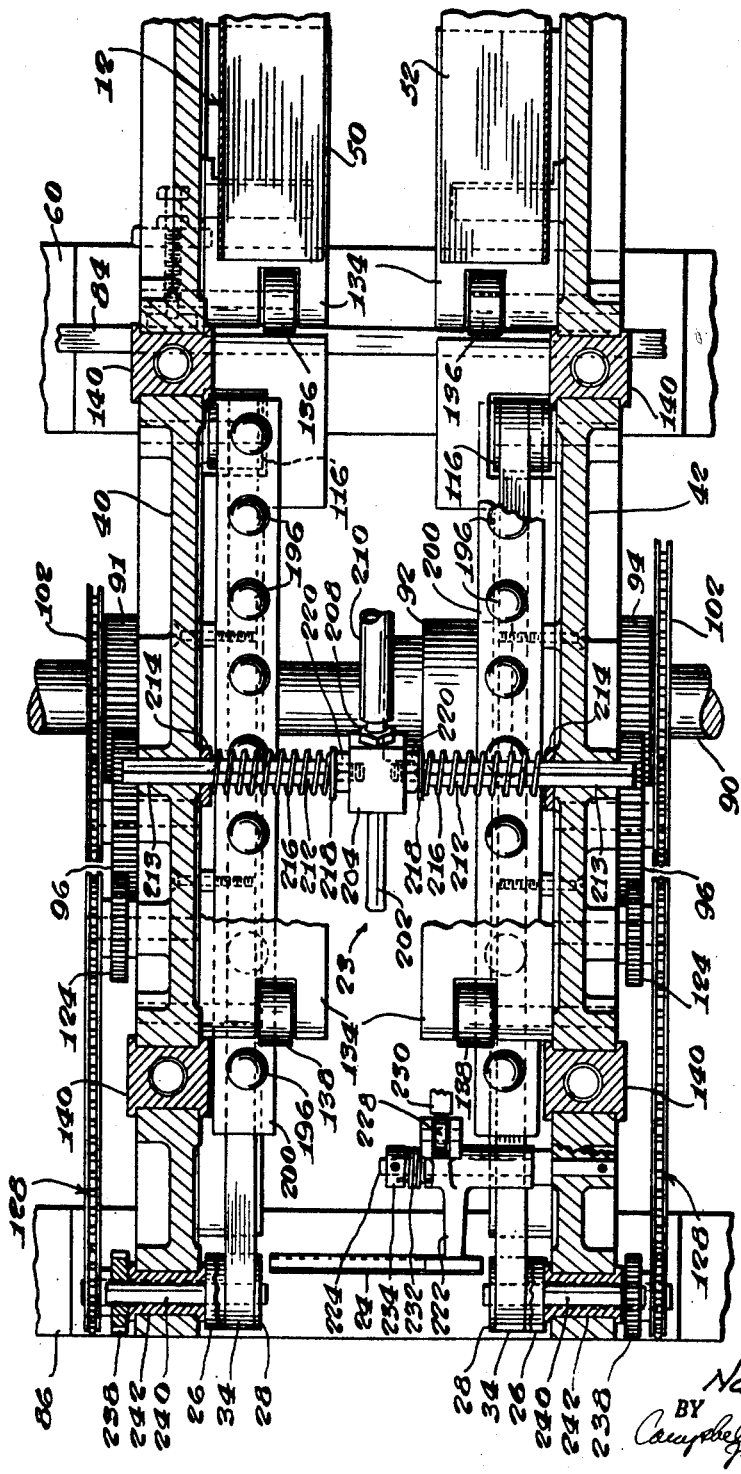
Figure 11:
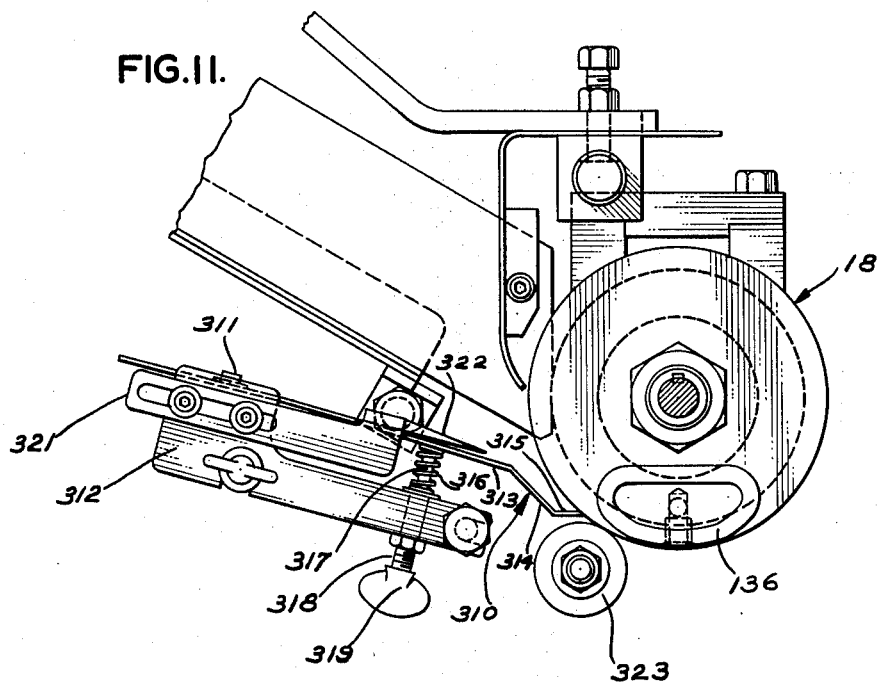
Figure 12:
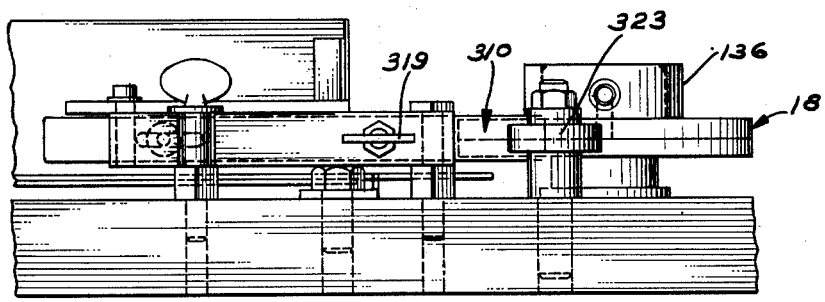

In the drawings illustrating the preferred embodiment of the invention, Figs. 1 and 2 are side and front elevations of the present collating machine; Fig. 3 is a cross-sectional view on line 3—3 of Fig. 2; Fig. 4 is a sectional plan on line 4—4 of Fig. 3; Fig. 5 is a sectional view on line 5—5 of Fig. 6 showing a sheet feeding unit; Figs. 6 and 7 are front elevations partly in section of a feeding roller of the sheet feeding unit in different positions of operation; Fig. 8 is a wiring diagram to be referred to; Fig. 9 is a front elevation partly in section, showing a modified form of sheet feeding mechanism; Fig. 10 is an end view, partly in section taken on line 10—10 of Fig. 9; Fig. 11 is a side view in elevation of a further modification; and Fig. 12 is a bottom view of the modification shown in Fig. 11.

In general, the present invention contemplates a novel and improved collating machine particularly adapted for handling greeting cards and envelopes in which provision is made for feeding an envelope from a stack thereof supported in a magazine or chute into operative position to receive a card and for feeding a card from a stack supported in a second magazine into a position to be disposed under the closing flap of the envelope and thereafter the collated envelope and card may be discharged into a box or other container positioned to receive the correlated articles.

In practice a battery of collating machines may be provided, each machine operating upon a different greeting card, and a plurality of containers may be intermittently advanced on a belt into operative relation to successive machines, each container receiving one collated article from each machine so that at the end of the line each container is provided with a plurality of different greeting cards correlated with their respective envelopes. Provision is also made in the preferred embodiment of the invention for detecting the failure of a unit to discharge a greeting card and envelope into the container and for providing an identifying mark on the container in such event so that when the container is delivered at the end of the line, the missing card or cards with their envelopes may be provided to assure a complete set of assorted cards in each container.

In the illustrated embodiment of the invention the collating machine comprises two spaced independently supported and driven half sections cooperating to guide and feed the articles to be collated and provision is made for adjusting one-half section with relation to the other for handling articles of different widths.

The present invention further contemplates a novel and improved feeding device adapted to feed the foremost card or envelope from a supply thereof carried on a magazine or chute in which they are arranged to be advanced by gravity into operative relation to a feeding wheel or roller having a portion of its circumference provided with a rubber surface arranged to frictionally engage the foremost article and in cooperation with a non-driven stationary rubber roller the foremost card or envelope is withdrawn from the magazine or chute. Heretofore, sheet or card feeding devices of the same general type have been successfully employed to feed cards of substantially uniform thickness, the rotary feed roller being adjusted with relation to the stationary roller to accommodate such thickness of card. However, if the cards should vary in thickness the device might fail to deliver successive cards, or, two or more cards might be delivered at once.

In accordance with one feature of the present invention, the feeding mechanism is capable of feeding sheets or cards of varying thickness so that a critical adjustment of the feeding device is not required each time a group of cards of a different thickness is supplied to the magazine. In the illustrated embodiment of the invention this is accomplished by the provision of a suction opening in the frictionally engaging surface of the feed roller to assure a positive engagement of the card with the roller, and, a positive stop member carried by and movable with relation to the feed roller is provided to prevent withdrawal of a succeeding card until the rubber surface of the roller again arrives into withdrawing engagement with the card during the next cycle of operation.

According to another embodiment of the invention, inadvertent and untimely withdrawal of a succeeding card is prevented by a resilient member which is urged into engagement with the feed roller and which is capable of limited yielding movement away from the feed roller to accommodate sheets of different thicknesses. Also, an idler roller is mounted for yielding engagement with the feed roller to continue advancement of the sheet being collated after the suction in the feed roller has ceased.

In the operation of the collating machine, an envelope withdrawn by one feeding unit is advanced into operative position to receive a card withdrawn from a second feeding unit, the card being inserted directly from the feeding unit under the flap of the envelope.

Referring now to the drawings 10, 12 represent magazines or feed chutes arranged to support a supply of sheet-like articles such as greeting cards 14 and a supply of envelopes 16, respectively, the foremost card being illustrated in Fig. 3 in engagement with a rotary feed wheel or roller indicated generally at 18, and the foremost envelope in engagement with a similar feed roller, indicated generally at 20. In general, in the operation of the machine, a card and an envelope are simultaneously withdrawn from their respective magazines, the card 14 being delivered under the flap 22 of a previously withdrawn envelope 16 which has come to rest against a cam-operated stop member 24. The flap 22 is preferably lifted to receive the card by a jet of air discharged from an air nozzle 23. The stop member 24 is then rocked to release the collated card and envelope which are then advanced between delivery rollers 26, 28 arranged to discharge the articles into a container 30 supported on a belt conveyer 32. In the meantime, the envelope which was withdrawn from the magazine 12 simultaneously with the card already discharged, is advanced on a belt 34 into engagement with the stop member 24 in position to receive a card withdrawn from the magazine 10 during the next cycle of operation.

As illustrated in Figs. 2 and 4, the collating machine includes two independently supported, separately driven and substantially symmetrical half sections indicated generally at 36, 38, each section being provided with a feed roller 18 for engagement with opposed marginal edges of the card to be withdrawn from the magazine 10, and, each section is also provided with a feed roller 20 for engagement with opposed marginal edges of the envelope to be withdrawn from the magazine 12. As herein shown, each section includes a side frame member 40, 42 mounted on the platen 44 of the machine, and each side frame member is arranged to adjustably support angular guide members 46, 48 respectively forming cooperating half portions of the card chute 10, and also a similar pair of guide members 50, 52 forming cooperating half portions of the envelope chute 12. As illustrated in Fig. 1 the chute guide members are pivotally mounted at their forward ends on similar studs 54 adjustably secured to the side frames and are arranged to be angularly adjusted by the provision of studs 56 disposed intermediate the ends of the guide members and arranged to be received and adjustably secured in curved slots 58 formed in the side frames 40, 42.

The purpose of the individually supported and separately mounted half sections 36, 38 is to permit one-half section to be adjusted with relation to the other to accommodate cards or envelopes of different widths and, as shown in Fig. 1, one of the side frames 42 is arranged to be clamped in a relatively fixed position to an elongated rail 60 secured to the machine frame. The rail 60 is provided with a laterally extended lip 62 which is received by an angular retaining member 64 secured to the underside of the side frame 42. The angular retaining member 64 is further provided with an upstanding lip 65 arranged to be received in a groove provided in the underside of the frame, as illustrated. The rear wall of the rail 60 is arranged in substantial alignment with a rear wall 67 of the side frame and a clamping member 68 is provided with an undercut portion 70 forming bearing portions 69, 71 for engagement with the rail and the side frame. The clamping member 68 is secured to the side frame by a bolt 72 so that when the bolt 72 is tightened the side frame 42 is clamped to the rail 60 by the cooperation of the retaining member 64 and the clamp member 68.

Referring now to Fig. 3, a similar construction is provided for clamping the side frame 40 to the elongated rail 60 except that provision is made for permitting the side frame to slide laterally along the rail when it is desired to change the spacing between the half sections. As herein shown, a similar retaining member 64, and a clamping member 74 in which no undercut is provided, is arranged to bear against the the aligned rear surfaces of the frame and the rail. The clamp member 74 is retained in clamped position by an elongated bolt 76 provided with a lock nut 78 and, the end of the bolt is arranged to extend into a slotted portion 80 in the side frame and in engagement with a clamping piece 82. The clamping piece 82 is arranged to engage an elongated rectangular bar 84 which also extends through a similar slotted portion 80 of the side frame 42, as shown in Fig. 1. With this construction it will be seen that when the bolt 76 is tightened the side frame 40 is clamped to the bar 84 and when the lock nut 78 is tightened the side frame is clamped to the rail 60. When it is desired to adjust the side frame 40 with relation to the frame 42, the lock nut 78 is loosened to free the frame from locking engagement with the rail and the bar 84 is moved longitudinally, moving the frame 40 clamped thereto along the top of the rail. During the adjusting operation, the bar 84 is free to slide through the slot 80 in the relatively stationary side frame 42. It will be observed that when a plurality of spaced collating units are mounted on the rail 60, the elongated bar 84 may extend continuously through the slotted openings 80 in the side frames, being slidingly movable through the stationary frames 42 and clamped to the frames 40 so that by longitudinal movement of the single bar 84 simultaneous adjustment of all of the units may be obtained. It will also be observed that the forward ends of the frames 40, 42 are supported upon an elongated rail 86 forming a part of the machine frame.

Provision is made for continuously driving the feed rollers 18, 20 and the feed belts 34 of each half section 36, 38 through similar but separate and individual driving connections from a main drive shaft 90 journaled in bearings, one of which is indicated at 92, attached to the machine frame. As best shown in Figs. 1 and 2, the driving connections for the half section 38 includes a gear 94 fast on the drive shaft 90 and which cooperates with a gear 96 rotatably mounted on a stud 98 carried by the side frame 42. A sprocket 100 formed integrally with the gear 96 is connected by a chain 102 to similar sprockets 104, 106 fast on the feed roller shafts 108, 110, respectively, to effect continuous and simultaneous rotation of both rollers 18, 20 at the same rate of speed and in the same direction. The drive chain 102 is also arranged to pass over an idler sprocket 111, as illustrated in Fig. 1.

The belt 34, on which the envelopes are supported and carried into operative position to receive a card, is arranged to run over the drive pulley 28 fast on a stud 114 rotatably mounted in the side frame 42 and over idler pulleys 116, 118 rotatably mounted on studs 120, 122, respectively, which are secured to the side frame 42. The belt 34 is arranged to be driven at a relatively faster rate than the speed of the feed rollers through connections including a gear 124 rotatably mounted on a stud 126 carried by the side frame and which is arranged to mesh with the gear 96. A chain and sprocket drive 128 connects the stud 126 to the drive pulley stud 114 as clearly shown in Figs. 1 and 4.

The drives to the feed rollers 18, 20 and the feed belt 34 of the half section 36 are similar in all respects to the drives above described except that provision is made for permitting longitudinal movement of the main driving gear along the main drive shaft 90. As best shown in Figs. 2 and 3, the main driving gear 91 for the half section 36 may be provided with a grooved hub 130 arranged to receive a yoke member 132 secured to the side frame 40 so that in operation, when the half section 36 is moved the driving gear 91 will move along with it, the gear being rotatably connected to the shaft by an elongated key 93 over which it may slide longitudinally during movement of the half section.

From the description thus far, it will be observed that the half sections 36, 38 of the collating unit are individually mounted and driven and that one-half section may be adjusted with respect to the cooperating half section to accommodate cards or envelopes of different widths, the feed rollers 18, 20 of each half section being driven at corresponding speeds for simultaneous engagement with the marginal edges of the foremost cards or envelopes in their respective chutes, and, the feed belts 34 also being driven at corresponding speeds but at a faster rate than the speed of the rollers.

Referring now particularly to Fig. 3, the cards 14 and the envelopes 16 are upended or substantially vertically disposed in their respective chutes 10, 12 being supported along their lower edges between the guide members 46, 48 and 50, 52 and are arranged to slide by gravity off the forward ends of their respective guide members and down onto auxiliary supporting members, each comprising a pair of spaced bottom guide rails 134 secured to the side frames 40, 42 and construction being such as to effect spreading or fanning out of the stack and to present the foremost card or envelope against its respective feed roller 18, 20, as shown in Fig. 3.

As best shown in Figs. 5, 6 and 7, each feed roller 18, 20 includes a rubber band 136 arranged to provide a frictional engaging surface for a portion of the periphery of the roller and each roller is arranged to cooperate with a lower roll 138 comprising a stationary, non-rotatable rubber roll secured to its respective side frame 40, 42, the lower roll being arranged to frictionally retain the second sheet during withdrawal of the foremost sheet by the rubber band 136.

Provision is made for adjusting the feed roller vertically with respect to the lower rubber roll 138 to provide a spacing which permits the foremost sheet to pass and to prevent passing of the second sheet between the rolls, and, as herein shown, each roller is mounted to rotate with its respective stud 108, 110 which studs are journaled in similar block bearings 140 slidably mounted in vertical guides 142 formed in the side frames. Each slide block 140 is urged upwardly in its vertical guide by a spring 144 interposed between the bottom of the guide and the underside of the block to present the upper end of the block against a hollow adjusting screw 146. The adjusting screw is mounted in a cap member 148 extending across the upper ends of the arms forming the vertical guide 142. Thus, rotation of the adjusting screw in one direction urges the roller mounting downwardly and rotation in the other direction permits the spring 144 to elevate the mounting unit in the guide to provide the most efficient spacing between the feed roller and its cooperating lower roll 138.

In the operation of the sheet feeding device thus far described, it will be observed that the foremost sheet in the chute is withdrawn by the rubber band engaging surface 136 of the feed roller each revolution thereof, the succeeding sheet being retained by the frictional engagement of the lower stationary rubber roll 138. In practice, the foremost group of sheets which have dropped down on the auxiliary guide rails 134 and are spread apart vertically tend to assume a curved or arcuate form and not to project the lower edges of the sheets into the bight of the cooperating rollers. Thus, in operation, when the foremost sheet is engaged by the rubber surface 136 of the feed roller, the next succeeding sheet is in a position to cover the lower roll so that the foremost sheet may easily slide past the lower roll by virtue of the paper to paper contact, the succeeding sheet being retained by the frictional engagement of the lower rubber roll, as described.

While the above described manner of feeding has been found successful in feeding sheets of substantially uniform thickness, it will be appreciated that a critical adjustment is required between the feed roller and the retaining roller to prevent the passage of two or more sheets to prevent failure of a sheet to be withdrawn. In the use of the present collating device, it is desired to feed different groups of cards or envelopes in the same unit or to interchange one group with another, as the occasion requires, and such cards or envelopes may vary in thickness. In the construction of the sheet feeding unit, as thus far described, it will be seen that each interchange of sheets of different thickness would require a corresponding change in adjustment of the feed rollers. However, in accordance with one feature of the present invention, provision is made for assuring withdrawal and feeding of successive foremost sheets of varying thickness within reasonable limits without requiring adjustment of the feed rollers, a position of adjustment for the maximum thickness of sheet being maintained for feeding the sheets of lesser and variable thickness.

This is accomplished by the provision of a suction opening 150 in the rubber band 136 arranged to draw the foremost sheet into positive engagement with the feed roller during the feeding operation, and the provision of a holding finger 152 arranged to positively prevent passage of the sheets until engaged by the rubber band portion of the feed wheel. As best shown in Fig. 6, the rubber band 136 is stretched about a laterally extended arcuate rib portion 154 formed integrally with a roller disc 156 mounted on the stud 108 for rotary adjustment with respect to a driving disc 158 keyed to the stud, the roller disc being secured to the driving disc for rotation therewith by a nut 160 cooperating with reduced diameter threaded end of the stud. Provision is made for connecting the rotating member to a source of suction and, as herein shown, a stationary vacuum shoe 162 provided with a passageway 164 is carried by the bearing block 140 and is arranged to yieldingly bear against the rear face of the driving disc 158 by the provision of a spring 166 disposed in a chamber 168 formed in the block. The chamber 168 is arranged to communicate with a source of suction through a pipe 170 secured in the top of the block 140 and which extends through the hollow adjusting screw 146, the construction permitting adjustment of the bearing block without interference with the air pipe. The passageway 164 in the vacuum shoe is open to the chamber 168 at one end and terminates in an arcuate grooved portion 172 cut in the face of the shoe and concentric with the driving disc against which it bears. The driving disc 158 is provided with an opening 174 on the same radius as the arcuate groove and which connects the grooved portion 172 with an annular chamber 176 formed in the cooperating face of the roller disc 156, when the opening 174 is in communication with the groove 172 in the stationary vacuum shoe during the rotation of the driving disc. The annular chamber 176 communicates with the suction opening 150 in the rubber band by a passageway 178 formed in the rib portion 154, as shown in Fig. 5.

From the description, thus far, it will be seen that in the operation of the device, when the rubber band with the suction opening 150 adjacent the forward end thereof is rotated into engagement with the foremost sheet in the group, the connecting opening 174 in the driving disc 158 arrives into communication with the arcuate grooved chamber 172 in the vacuum shoe to provide suction at the opening 150 and that the suction is maintained as long as the opening 174 remains in communication with the groove during which time the foremost sheet is being withdrawn, whereupon the opening 174 passes beyond the groove and the vacuum is cut off. In order to adjust the roller disc with relation to the driving disc, for the purpose of varying the setting at which the suction is initiated for the most efficient operation, the nut 160 may be loosened and the roller disc rotated to the desired position, whereupon the nut may again be tightened. In this manner, the foremost sheet is positively drawn into engagement with the feed roller during the withdrawing operation and together with the frictional engagement of the rubber band 136 effects withdrawal of the sheet.

The holding finger 152 for each feed roller is mounted to rotate with the feed roller and is also free to rotate with relation to the roller for a portion of each revolution, the object being to permit the stop finger to come to rest substantially at a point of tangency with the stationary rubber roller 138 to hold a succeeding sheet and the group of sheets in abeyance until the feed roller again presents the frictionally engaging band into engagement with the succeeding foremost sheet, whereupon the stop finger is released to rotate with and with relation to the feed roller. As best shown in Fig. 5, the holding finger 152 is rotatably mounted on a shouldered portion 180 of a collar 182 which is adjustably secured to the nut 160 by a set screw 184. A torsion spring 186 coiled about the collar 182, and having its ends secured in the holding finger and in the collar, respectively, effects rotation of the finger against the trailing end of the arcuate band portion 136 during the feeding operation, as illustrated in Fig. 7.

In order to bring the holding finger to rest substantially in alignment with a radial line extending from the center of the feed roller to the center of the stationary roller, after the band portion 136 has passed and withdrawn the foremost sheet, a spring stop 188 is provided which is arranged to engage a pin 190 carried by the finger 152. As shown in Fig. 5, the spring stop is secured to an angle bracket 191 supported from the side frame and is provided with an inwardly bent edge portion 192 disposed at an angle with relation to the circular path of the pin 190, see Figs. 6 and 7, and in a manner such as to obstruct the passage of the pin and to stop the holding finger in a position to cooperate with the roller 138 in preventing passage of succeeding sheets, as shown in Fig. 6. As herein shown, the holding finger is provided with an arcuate end portion 194 having a radius slightly greater than the radius of the arcuate band portion 136. During the rotation of the feed roller with the holding finger 152 at rest, the torsion spring 186 is wound up, and, when the leading end of the arcuate band portion 136 engages the holding finger 152, the spring stop 188 is permitted to flex to release the finger whereupon the finger is rotated by the torsion spring into engagement with the trailing end of the arcuate band portion, as shown in Fig. 7.

In practice, the feed roll is set with relation to the opening 174 to initiate the suction at the opening 150 substantially at the same time that the holding finger 152 is engaged and released by the leading end of the band portion 136, as shown in Fig. 6, so that in operation the foremost sheet is drawn into engagement with the band and permitted to pass beyond the stationary rubber roller 138, a succeeding sheet having projected itself over the rubber roller. The frictional engagement of the band 136 on one side of the foremost sheet effects withdrawal of the latter over the contacting paper surface of the succeeding sheet, and the latter is retained by the frictional engagement of the stationary rubber roll 138. After the band portion 136 has passed beyond the roll 138 the holding finger 152 immediately engages the succeeding sheet and comes to rest to retain the sheet against the roll 138 and prevent passage thereof until the finger is released during the next cycle of operation.

As above stated, the feed rollers 18, 20 operate simultaneously to feed a card and an envelope from their respective chutes, and provision is made for inserting the card 14 under the flap 22 of an envelope which was withdrawn during the previous cycle of operation and which has been advanced by the belt 34 into engagement with a movable stop member 24. As best shown in Fig. 3, the envelopes 16 are stacked vertically in the chute 12 with the flap portions disposed at the lower forward end so that when an envelope is withdrawn it is disposed flat upon the belts 34 with the flap uppermost at the forward end. As herein shown, the envelopes extend transversely between the spaced belts 34 being engaged and advanced with the belts along their marginal edges and are retained in engagement with the spaced belts by weighted balls 196 which are supported for rotation and vertical movement in openings 198 provided in side rails 200 secured to their respective frame members. Thus, in operation, an envelope withdrawn by the feed roller 20 is received between the belts 34 and the weighted balls 196, the latter serving to hold the envelopes in engagement with the belts and is permitted to rotate by the frictional engagement of the envelopes therewith during the advancing movement to present the envelope against the stop 24, as described.

The air or blower nozzle 23 for lifting the closing flap 22 to permit insertion of a card thereunder during the next cycle of operation is preferably arranged to blow a continuous stream of air to effect the flap lifting operation and, as herein shown, is disposed substantially centrally between the two half sections 36, 38 being supported between the side frames 40, 42 in a manner such as to maintain the nozzle unit in a central position when the side frames are adjusted for different widths of cards and envelopes. The nozzle pipe 202 is foxed in a block 204 which is provided with a passageway 206 in communication with a connection 208 for receiving a flexible tube 210 which may be connected to any usual or preferred source of air under pressure. The block is supported by two laterally extended square rods 212 which may be threadedly connected at their inner ends to both sides of the block 204 and which extend through round openings 213 in the side walls 40, 42. The rods 212 are also arranged to pass through relatively thin retaining plates 214 attached to the side frames and having square openings to prevent rotation of the assembled supporting unit. Coil springs 216 are provided on both sides of the block being interposed between a washer 218 and the retaining plates 214. The threaded ends of the rods are also provided with lock nuts 220 to permit adjustment of the block to a suitable angular position to direct the stream of air under the flap 22. With this construction it will be seen that when the side frames 40, 42 are adjusted with relation to each other, the square rods 212 may pass freely through the openings in the side walls and the retaining plates 214 and are maintained in a substantially central position by the equal pressure of the coil springs 216.

In the operation of the machine, a card is projected under the envelope flap 22 while the latter is held up by the stream of air from the nozzle 23 and immediately thereafter the cam operated stop member 24 is rocked out of the path of the collated card and envelope to permit the same to advance between the rollers 26, 28 to be discharged into the container 30 disposed on the conveyer belt 32. As best shown in Fig. 3, the cards are guided from the feed roller by angular cut out portions 29 formed in the forward ends of the ball retaining side rails 200 so that in operation the leading edge of the card is projected under the flap while the card is disposed in an upwardly and rearwardly inclined position, the card and envelope being brought into parallel relationship when they are ejected by the rollers 26, 28. As illustrated in Figs. 2 and 3, the stop member 24 is attached to one arm 222 of a lever pivotally mounted on a stud 224 fixed in the side frame 42. The other arm 226 of the lever is provided with a cam roll 228 arranged to cooperate with a cam 230 fast on an extension of a stud 108 carried by the side frame 42. The cam 230 may and preferably will be adjustably fixed to the stud 108 and is preferably arranged to permit the stop member 24 to rock out of the path of the articles immediately after a card has been inserted in the envelope. A coil spring 232 wound about the stud 224 and having its ends fast in the cam and in a collar 234 secured to the stud is arranged to effect rocking of the lever in a clockwise direction to hold the roller against its cam, the cam being designed to effect counterclockwise movement of the lever to present the stop member 24 in operative position.

As herein shown, the lower rolls 28, over which the belts 34 travel are geared to the upper rolls 26 by cooperating spur gears 236, 238 the latter being fast on studs 240 journaled in slide blocks 242 arranged for vertical movement in the side frames 40, 42, respectively, the slide blocks being urged downwardly by springs 244 interposed between cap members 246 and the upper ends of the blocks. The belts 34, as best shown in Fig. 2, are retained in grooved portions of the lower rolls 28 to present the outer surfaces of the belts substantially flush with the outside diameter of the rolls. Thus, during each cycle of operation, a collated article is ejected by the rollers into the container 30. The rollers 26, 28 and the belts 34 are preferably driven at a relatively faster rate of speed than the feed rollers 18, 20 in order to quickly discharge the collated articles and permit the stop member 24 to be brought down into operative position to stop the simultaneously withdrawn envelope being advanced by the belt 34 in position to receive the next card withdrawn.

Provision is also made in the preferred embodiment of the invention for detecting the failure of a collating unit to eject a collated article during each cycle of operation of the machine and, upon such failure, provision is made for printing an identifying mark upon the container so that when the container arrives at the delivery end of the conveyer, the operator may place therein such missing article or articles to complete the set. As illustrated in Figs. 1 and 8, this is accomplished by an electrical circuit 249 which includes a microswitch 250 which is normally closed and arranged to be opened upon passage of a card between the rollers, and a cam operated switch 252 arranged to be closed during the period in the cycle when an article does pass or should have passed between the rollers 26, 28. As shown in Figs. 1 and 2, each slide block 242, by which the upper rollers 26 are carried, is provided with an upstanding rod 254 which extends through the cap member 246 and is guided at its upper end in a supporting bar 256 attached to the side frame, so that when the slide blocks 242 are elevated by a collated article passing between the rollers, the rods 254 are moved vertically. A contact member or switch arm 258 adjustably secured to one of the rods 254 is arranged to cooperate with the microswitch 250 to effect opening of the circuit when an article passes between the ejecting rollers. A solenoid operated printing element 260 also included in the circuit 249 is disposed adjacent the conveyer belt 32 and in operative relation to the container 30 to print an identifying mark, such as the number of the card or the collating unit associated therewith, on the side wall of the container when the solenoid 261 is energized. The switch 252 is operated by a cam 262 fast on the main drive shaft 90 and which is arranged to cooperate with a cam roll 234 carried by a pivotally mounted arm 265. Thus, in the operation of the machine, when a collated card and envelope fails to pass between the rollers 26, 28, the switch arm 258 will not be elevated to open the normally closed microswitch 250, and the circuit being also closed at the switch 252 by the cam 262 at this time, the solenoid 261 is energized to effect printing of an identifying mark on the container. Conversely, in the normal operation of the machine, when a collated card and envelope does pass between the rollers 26, 28 the switch arm 258 is elevated to open the circuit at the normally closed switch 250 so that although the cam operated switch 252 is closed at this time the solenoid 261 will not be energized.

From the above description, it will be seen that the wiring diagram illustrated in Fig. 8 for a single collating unit may be duplicated for each of a plurality of collating units in the line and that but one master cam 262 is required for the entire circuit to effect closing of the switch 252 at the period in the cycle when a collated article is or should be ejected by the rollers 26, 28 so that when the container arrives at the end of the line the operator may place in the container such missing cards and envelopes as are indicated by the printed matter on the side wall of the container.

As generally indicated in Fig. 1, the belt conveyer 32 may be continuously driven to advance the containers 30 along the belt between suitable guide rails 268, 270, and the containers are arranged to be brought to rest in operative relation to their respective collating units and in timed relation to the operation thereof, by solenoid operated stop fingers 272, one of which is shown in Fig. 1. As diagrammatically illustrated in Fig. 8, the stop fingers 272 for each collating unit may be simultaneously operated by a master cam 274 fast on the main drive shaft 90 and which is arranged to cooperate with a cam roll 276 carried by a pivotally mounted arm 278 to effect closing of a switch 280 in the circuit 282 to the solenoid 284 for the stop finger, the circuit 282 shown in Fig. 8 being duplicated for each collating unit. Thus, in operation, successive containers 30 are in effect intermittently advanced into operative relation to successive collating units to receive a different greeting card and envelope from each unit to make up a box of assorted greeting cards.

A modified form of sheet feeding mechanism embodying the present invention is illustrated in Figs. 9 and 10 in which the holding finger 152 is eliminated and the stationary rubber roller 138 is replaced by a cooperating metal member 300 shaped to support the foremost sheets in the magazine in cooperating relationship with the feed roller and to permit but one sheet at a time to be withdrawn from the magazine. As herein shown, the modified construction includes a feed roller provided with a yieldable friction band 136 similar to that described to provide a frictional engaging surface for a portion of the periphery of the roller, the radius of the friction band being slightly greater than the radius of the supporting and driving members 156, 158, respectively, of the feed roller. The feed roller is arranged to cooperate with the stationary metal member 300, herein shown, in the form of a roll having a concave portion 302 disposed to be substantially coextensive with the supporting rail 134 and terminating in a flatted portion 304 spaced from and arranged to cooperate with the friction band 136 to permit the foremost sheet to be withdrawn by the friction band, the succeeding sheet being held back by the engagement with the upwardly curved portion of the concave surface 302. Although, for practical purposes, the concave and flatted surfaces 302, 304 could be formed by an integral extension of the rail 134, it is preferred to provide a separate member 300 mounted on a stud 306 to permit rotation of the member 300 on the stud in order to adjust the flatted portion 304 with relation to the arcuate friction band 136 for most efficient operation, the member 300 being maintained in its adjusted position by a nut 308 cooperating with the threaded end of the stud.

In the operation of the modified sheet feeding mechanism, thus far described, the sheets are fed into cooperation with the feed roll by gravity, being arranged to slide down the upper chute and onto the lower supporting rails 134 on edge and in a rearwardly inclined position with the lower edges of the foremost sheets resting in the concave pocket 302. The concave surface may and preferably will be polished smooth to provide a low friction surface to permit the sheets to be freely advanced thereover by the slight urging of the succeeding sheets of the group so that the foremost sheet will be projected onto the flatted surface 304 during the period of rotation when the metal discs 156, 158 are in engagement with the foremost sheet, such discs being of a radius such as to provide a space between the discs and the flatted surface 304, whereupon the sheet will be withdrawn by the yieldable friction band when the latter is rotated into pressing engagement therewith. The spacing between the flatted surface 304 and the friction band 136 may be such as to permit but one sheet to pass and the slightly upturned end of the concave portion 302 serves to retain the succeeding sheets in the magazine. In practice, the spacing may be adjusted to accommodate a sheet of maximum thickness so that other groups of sheets of lesser and variable thicknesses may be withdrawn without further rotary adjustment of the cooperating member 300. In the preferred and illustrated embodiment of the modified form of the invention, the feeding mechanism may be provided with suction means including a suction opening 150 in the friction band similar to that heretofore described, in order to assure the lifting of the lower edge of the foremost sheet over the upturned portion of the concave surface 302 and onto the flatted surface 304 to be withdrawn by the friction band 136.

In the form of the invention shown in Figs. 11 and 12, resilient means is provided for preventing a succeeding sheet from being ejected while the ejection of a first sheet is in process. The resilient member may comprise, for example, a leaf spring 310 secured at 311, in any suitable manner, to a bracket 312 mounted on the side member. The leaf spring 310 preferably has a flat portion 313 which extends to a location a short distance away from the feed roller 18, a portion 314 which extends downwardly and inwardly toward the feed roller 18 and a flat tip portion 315 which is adapted to engage the surface of the feed roller 18, as shown in greater detail in Fig. 12.

The tension in the leaf spring 310 may be controlled, in any suitable manner as, for example, by interposing a compression spring 316 between the under side of the leaf spring 310 and the bracket 312, as shown. Also, downward movement of the leaf spring 310 to accommodate cards or other sheet material therebetween and the face of the feed roller 18 may be limited by a limit stop 317 preferably having a threaded portion 318 and a flattened head 319 by means of which its position may be adjusted to some extent.

The bracket 312 also carries a slidably adjustable arm 321 having a forward tapering portion 322 thereon which forms a sliding support for cards, or other sheet-like material which may be supplied to the machine. Mounted beneath the feed roller 18 for yielding engagement with the periphery thereof is an idler roller 323. Yieldable rollers of this type are well known and it will not be necessary, therefore, to show the details of construction.

In operation of the modification shown in Figs. 11 and 12, cards or other sheet-like material stacked in the chute fall upon the tapering forward member 322 and slide downwardly along the leaf spring 310. When the rubber band 136 passes the first card or sheet, and suction is initiated, the first card is separated from the stack and is advanced between the feed roller 18 and the tip portion 315 of the leaf spring 310 until it is caught between the feed roller 18 and the idler roller 323. The latter rollers cooperate to continue the advancement of the sheet or card after the suction in the rubber band 136 has ceased. As stated, the idler roller 323 is mounted for yielding engagement with the face of the feed roller 18 so as to accommodate sheets or cards of different thicknesses.

It will be noted that while the first sheet or card is being advanced between the feed roller 18 and the idler roller 323, the second card is retained in the machine by the tip portion 315 of the leaf spring 310 which is continuously urged into engagement with the face of the feed roller 318, as shown in Fig. 11. By virtue of this construction, the machine is highly effective and reliable in operation.

This modification differs from the forms of the invention shown in Figs. 5-7, inclusive, and Figs. 9 and 10 in that there is no cooperating friction roller for the rubber band 136 so that the feeding is accomplished by suction alone until the sheet or card is caught between the feed roller 18 and the idler roller 323. With this construction, the rubber band 136 tends to separate the first card or sheet from the rest of the stack and a more positive feed obtains.

While the preferred form of the invention has been herein illustrated and described, it will be understood that the invention may be embodied in other forms, within the scope of the following claims.

Having thus described the invention, what is claimed is:

1. In a machine of the character described, sheet feeding means comprising an inclined chute for supporting a plurality of upended sheets, said chute including at least two successive portions of different inclinations, the portion of lesser inclination being at the discharge end thereof and adapted to support a plurality of sheets prior to feeding, a rotary feeding unit associated with said chute and having its axis of rotation disposed in a horizontal plane above the discharge end of said chute and laterally spaced therefrom in the direction of movement of the sheets down the chute, said feeding unit including a feed roller having a high friction engaging surface for a portion of its periphery for frictionally engaging and feeding the foremost sheet in said chute, said chute being arranged with its portion of lesser inclination nearest to the orbit of said high friction surface and particularly underlying said orbit to cause the sheets to fan out at the lower ends with the foremost sheets being curved about the center of curvature of the orbit of rotation of the high friction surface, and suction means cooperating with said friction engaging surface to draw the foremost sheet into engagement therewith during the withdrawing operation.

2. In a machine of the character described, sheet feeding means comprising an inclined chute for supporting a plurality of upended sheets, and a rotary feeding unit associated with said chute including a feed roller having a high friction engaging surface for a portion of its periphery for frictionally engaging and feeding the foremost sheet in said chute, and suction means cooperating with said friction engaging surface to draw the foremost sheet into engagement therewith during the withdrawing operation, and a stationary roller having a high friction engaging surface and spaced a predetermined distance from said feed roller and operative to retain the second sheet in said chute during withdrawal of said foremost sheet.

3. In a machine of the character described, sheet feeding means comprising an inclined chute for supporting a plurality of upended sheets, and a rotary feeding unit associated with said chute including a feed roller having a high friction engaging surface for a portion of its periphery for frictionally engaging and feeding the foremost sheet in said chute, and suction means cooperating with said friction engaging surface to draw the foremost sheet into engagement therewith during the withdrawing operation, and a stationary roller having a high friction engaging surface and spaced a predetermined distance from said feed roller and operative to retain the second sheet in said chute during withdrawal of said foremost sheet, a movable holding finger, stop means for positioning said holding finger at rest in cooperating relation with said stationary roller to prevent escape of succeeding sheets after the frictionally engaging surface of the feed roller has passed by and effected withdrawal of said first sheet, means responsive to rotation of said feed roller after withdrawal of a sheet for disabling said stop means and for moving said holding finger away from said stationary roller, said holding finger being movable with said feed roller to be positioned by said stop means in cooperating relation with the stationary roller after withdrawal of the next sheet by said feed roller.

4. In a machine of the character described, sheet feeding means comprising an inclined chute for supporting a plurality of upended sheets, and a rotary feeding unit associated with said chute including a feed roller having a high friction engaging surface for a portion of its periphery for frictionally engaging and feeding the foremost sheet in said chute, and suction means cooperating with said friction engaging surface to draw the foremost sheet into engagement therewith during the withdrawing operation, and a stationary roller having a high friction engaging surface and spaced a predetermined distance from said feed roller and operative to retain the second sheet in said chute during withdrawal of said foremost sheet, and means for adjusting the relative spacing between the feed roller and said stationary roll.

5. In a machine of the character described, in combination, sheet feeding means comprising an inclined chute for supporting a plurality of upended sheets, a rotary feeding unit associated with said chute including a feed roller having a high friction engaging surface for a portion of its periphery for frictionally engaging and feeding the foremost sheet in said chute, a stationary roller having a high friction engaging surface and spaced a predetermined distance from said feed roller, a holding finger carried by and rotatable with said feed roller, stop means for positioning said finger, during the withdrawing operation, at rest in cooperating relation with said stationary roller to prevent escape of succeeding sheets after the friction engaging surface of the feed roller has passed by and effected withdrawal of said first sheet, and means responsive to rotation of said feed roller after withdrawal of a sheet for disabling said stop means and for rotating said holding finger with said feed roller to reestablish said stop means immediately after the next subsequent withdrawal of a sheet by the feed roller.

6. In a machine of the character described, in combination, sheet feeding means comprising an inclined supply chute for supporting a plurality of upended sheets, a rotary feeding unit associated with said supply chute including a feed roller having a frictionally engaging surface for a portion of its periphery for frictionally engaging and feeding the foremost sheet, a holding member and operative to retain the second sheet during withdrawal of said foremost sheet, and an auxiliary chute disposed between said supply chute and said feed roller and at a lower level than the supply chute arranged to effect fanning out said upended sheets to project the sheets in operative relation to said rollers.

7. In a machine of the character described, sheet feeding means comprising a feed roller having a high friction engaging surface for a portion of its periphery, means for supporting a stack of upended sheets in operative relation to said feeding roller, said supporting means having a low friction surface upon which the ends of the sheets are supported and provided with a curved and slightly upturned portion adjacent the periphery of said feed roller, the inner upturned end of the low friction surface normally forming an angle with the tangent to the adjacent surface of the feed roller, said supporting means also having a flatted portion intersecting said upturned portion and spaced a predetermined distance from said feed roller for cooperation with said high friction engaging surface to effect feeding of successive foremost sheets from said stack.

8. In a machine of the character described, sheet feeding means comprising a feed roller having a high friction engaging surface for a portion of its periphery, means for supporting a stack of upended sheets in operative relation to said feeding roller, said supporting means having a low friction surface upon which the ends of the sheets are supported and provided with a curved and slightly upturned portion adjacent the periphery of said feed roller, the inner upturned end of the low friction surface normally forming an angle with the tangent to the adjacent surface of the feed roller, said supporting means also having a flatted portion intersecting said upturned portion and spaced a predetermined distance from said feed roller for cooperation with said high friction engaging surface to effect feeding of successive foremost sheets from said stack, and suction means cooperating with said high friction engaging surface to draw the foremost sheet into engagement therewith during the feeding operation.

9. In a machine of the character described, sheet feeding means comprising a feed roller having a high friction engaging surface for a portion of its periphery, means for supporting a stack of upended sheets in operative relation to said feeding roller, said supporting means having a low friction surface upon which the ends of the sheets are supported and provided with a curved and slightly upturned portion adjacent the periphery of said feed roller, the inner upturned end of the low friction surface normally forming an angle with the tangent to the adjacent surface of the feed roller, said supporting means also having a flatted portion intersecting said upturned portion and spaced a predetermined distance from said feed roller for cooperation with said high friction engaging surface to effect feeding of successive foremost sheets from said stack, and means for adjusting said supporting member with relation to said high friction engaging surface for varying said predetermined distance.

10. In a machine of the character described, sheet feeding means comprising a feed roller having yieldable and high friction engaging surface for a portion of its periphery, means for supporting a stack of sheets in a rearwardly inclined position and in operative relation to said feeding roller, said supporting means including an inclined chute and a cooperating member substantially coextensive therewith having a low friction surface comprising a concave and slightly upturned portion adjacent the periphery of said feed roller over which the upended sheets may be freely advanced by the pressure of succeeding sheets, the upturned portion of said low friction concave surface forming an angle with the adjacent tangent to said feed roller, said cooperating member also having a flatted portion coextensive with said upturned portion and spaced a predetermined distance from said feed roller for cooperation with said yieldable high friction engaging surface to effect feeding of successive foremost sheets from said stack, the succeeding sheets being held back by engagement with said slightly upturned surface.

11. In a machine of the character described, sheet feeding means comprising a feed roller having a yieldable and high friction engaging surface for a portion of its periphery, means for supporting a stack of sheets in a rearwardly inclined position and in operative relation to said feeding roller, said supporting means including an inclined chute and a cooperating member substantially coextensive therewith having a low friction surface comprising a concave and slightly upturned portion adjacent the periphery of said feed roller over which the upended sheets may be freely advanced by the pressure of succeeding sheets, the upturned portion of said low friction concave surface forming an angle with the adjacent tangent to said feed roller, said cooperating member also having a flatted portion coextensive with said upturned portion and spaced a predetermined distance from said feed roller for cooperation with said yieldable high friction engaging surface to effect feeding of successive foremost sheets from said stack, the succeeding sheets being held back by engagement with said slightly upturned surface, and suction means cooperating with said high friction engaging surface to draw the foremost sheet into engagement therewith during the feeding operation.

12. In a machine of the character described, sheet feeding means comprising an inclined chute for supporting a plurality of upended sheets, a rotary feeding unit associated with the chute including a feed roller for feeding the foremost sheet in the chute, a flat resilient member having a first portion forming a support for the foremost of said sheets inclined in the direction of infeeding, a flat portion extending downwardly at a greater angle of inclination than said first portion towards the feed roller and terminating in an inturned tip engaging said feed roller, the inturned tip of said resilient member serving to prevent withdrawal of a succeeding sheet while a preceding sheet is being withdrawn, and an abutment member disposed beneath said resilient member for defining the movement thereof, and supplementary, adjustable spring means for controlling the tension on said resilient member.

13. In a machine of the character described, sheet feeding means comprising an inclined chute for supporting a plurality of upended sheets, a rotary feeding unit associated with the chute including a feed roller for feeding the foremost sheet in said chute, suction means cooperating with the feed roller to draw the foremost sheet into engagement therewith during the withdrawing operation, said withdrawing operation occurring along the half of said feed roller beneath the horizontal plane passing through the axis thereof, substantially vertical wall means in said chute for shielding the upper half of said feed roller from the upper portions of the sheets in the chute, a flat resilient member adjacent the inner end of said chute for supporting the foremost sheets and including a flat portion extending downwardly at a greater angle of inclination than that of the chute and an inturned tip portion for engaging the feed roller, said inturned tip portion forming an angle with the tangent to the feed roller at the point of engagement therewith and affording a shelf for supporting a limited number of the foremost sheets and preventing withdrawal of each succeeding sheet while the preceding sheet is being withdrawn, the tip portion of said resilient member being adapted to be forced out of engagement with said feed roller for a distance permitting the withdrawal of a sheet between the said tip and the feed roller, and adjustable abutment means for controlling the movement of the tip from the feed roller.

14. In a machine as set forth in claim 13, said downwardly extending flat portion of said resilient member being disposed between vertical planes containing the said vertical wall means and the point of engagement of the tip of the resilient member with the feed roller, respectively.

15. In a machine as set forth in claim 12, a forwardly tapered support disposed at the inner end of said chute and overlying at least a portion of said resilient member to carry the weight of the rearmost sheets, and means for adjusting said forwardly tapered support along the line of infeed movement.

NATHAN H. MORRISON.

References Cited in the file of this patent

UNITED STATES PATENTS

| Number | Name | Date |
|---|---|---|
| 1,380,483 | La Bombard | June 7, 1921 |
| 1,706,952 | Broadmeyer | Mar. 26, 1929 |
| 1,721,608 | Swart et al. | July 23, 1929 |
| 1,833,311 | Winkler et al. | Nov. 24, 1931 |
| 1,991,989 | Trompier | Feb. 19, 1935 |
| 2,031,078 | Spiess | Feb. 18, 1936 |
| 2,058,979 | Henry | Oct. 27, 1936 |
| 2,080,968 | Krell | May 18, 1937 |
| 2,175,167 | Davidson | Oct. 10, 1939 |
| 2,224,138 | Trydal | Dec. 10, 1940 |
| 2,258,479 | Barkley | Oct. 7, 1941 |
| 2,279,269 | Tornberg | Apr. 7, 1942 |
| 2,351,854 | Hall | June 10, 1944 |
| 2,363,357 | Post | Nov. 21, 1944 |

FOREIGN PATENTS

| Number | Country | Date |
|---|---|---|
| 343,933 | Germany | Nov. 11, 1921 |